(12) United States Patent
Na et al.

(10) Patent No.: US 6,689,821 B2
(45) Date of Patent: Feb. 10, 2004

(54) CHEMICAL METHOD OF REMOVING PAINT FILM ON PLASTIC RESIN USING ISOPROPYL ALCOHOL

(75) Inventors: Seong Taek Na, Kyoungki-do (KR); John Hee Hong, Seoul (KR)

(73) Assignee: Hyundai Motor Company, Seoul (KR)

( * ) Notice: Subject to any disclaimer, the term of this patent is extended or adjusted under 35 U.S.C. 154(b) by 180 days.

(21) Appl. No.: 09/859,913

(22) Filed: May 17, 2001

(65) Prior Publication Data

US 2002/0103266 A1 Aug. 1, 2002

(30) Foreign Application Priority Data

Dec. 5, 2000 (KR) .......................................... 2000-73445

(51) Int. Cl.$^7$ ................................................ C08J 11/04
(52) U.S. Cl. ........................ 521/49.5; 521/48.5; 521/44
(58) Field of Search .......................... 521/46.5, 47, 48, 521/48.5, 49, 49.5

(56) References Cited

U.S. PATENT DOCUMENTS 4,594,176 A * 6/1986 Mahoney et al. ........... 252/153
4,858,264 A * 8/1989 Reinhart ..................... 15/93 R
5,334,225 A * 8/1994 Ogawa et al. ................ 134/38

FOREIGN PATENT DOCUMENTS

| JP | 05-200749 | 8/1993 |
| JP | 06-023748 | 2/1994 |
| JP | 06-198652 | 7/1994 |
| KR | 96-37238 | 11/1996 |

\* cited by examiner

Primary Examiner—Edward J. Cain
Assistant Examiner—Katarzyna W. Lee
(74) Attorney, Agent, or Firm—Christie, Parker & Hale, LLP

(57) ABSTRACT

Thermosetting paint film is removed by adding plastic resin coated with thermosetting paint film into a mixed solution of an alcoholic solvent and alkali and heating this mixed solution while stirring. Isopropyl alcohol, phenoxy alcohol and alkali are added in a reactor and heated to a temperature of 50–70° C. while stirring. Plastic resin coated with thermosetting paint film is added and a reaction is performed while maintaining the temperature. The isopropyl alcohol and phenoxy alcohol are added in a mixed ratio of 70–90:30–10.

1 Claim, No Drawings

CHEMICAL METHOD OF REMOVING PAINT FILM ON PLASTIC RESIN USING ISOPROPYL ALCOHOL

CROSS-REFERENCE TO RELATED APPLICATION

This application claims priority of Korea patent Application No. 2000-73445, filed on Dec. 5, 2000.

FIELD OF THE INVENTION

The present invention relates to a method of removing thermosetting paint film using isopropyl alcohol, and more specifically, to a method of removing thermosetting paint film comprising the steps of: adding plastic resin coated with thermosetting paint film into a reactor including a mixed solution of isopropyl alcohol, phenoxy ethanol and alkali at a predetermined temperature; allowing the mixture to react for a short time; and then removing the separated paint film. This invention provides an excellent method to remove thermosetting paint film, prevents heat aging thus enabling to consistently maintain inherent physical properties and secure safety even after removal of the film due to the much lower reaction temperature with a solvent as compared to those in conventional methods, prevents deterioration in physical properties caused by remaining impurities, provides a low cost process with a simplified manufacturing process and enables to effectively recycle a large amount of plastic resin waste.

BACKGROUND OF THE INVENTION

The majority of products used as parts in automobiles, household electronic appliances, everyday goods, etc. are coated with film on the plastic resin surface. In particular, the type of paint widely used in plastic coating is thermosetting paint because it can provide an excellent adhesion to a given plastic resin substrate. Therefore, it becomes a prerequisite to remove this paint film in order for a given thermosetting plastic resin to be recycled as a base material because simple melting process will not be sufficient to reutilize the plastic resin.

For this reason, many researches are under way, the key of which is an effective film removing technology. The film-removing technology is divided into two groups, i.e., physical methods and chemical methods. Physical methods are the ones removing paint film by applying physical force, as scraping with sandpaper. However, these methods are inefficient and uneconomical. Researches on removing of paint film by chemical methods are more prevalent due to the theoretical validity. Some important examples of these are as follows.

A method of using a removing solution which contains chlorine as a main component [Japanese Patent Publication No. 51-34238], a method of using a removing solution which contains organic material as a main component [Japanese Patent Publication No. 50-109925] and a method of using a removing solution which contains inorganic material as a main component [Japanese Patent Publication No. 50-109925] were disclosed. However, these methods were not shown to be practical because the removal of paint film was not always complete but rather depended on the kind and the thickness of paint film. Also, a method of recycling plastic resin by crushing waste automobile bumper cover to a size of 4–5 mm, dipping them in a mixed solution of glycol compounds, lithium hydroxide and water at 140–160° C. for 15–20 min, dehydrating them in a centrifuge, and then melt-mixing them [Korean Patent Publication No. 96-37238] and a method of removing thermosetting paint with depolymerization by crushing waste automobile bumper cover to a size of 4–5 mm, dipping them in glycol selected from ethylene glycol, diethylene glycol 1,2-propanol, 1,3-propandiol and dipropylene glycol in the presence of inorganic acetate or alkali catalyst at 120–165° C. for 2–30 min provide poor removing effect. Therefore, the recycled resin can be utilized only for a limited purpose. The greatest problem of said methods is that the treatment temperature is much higher than the melting temperature of polypropylene composite material. This high temperature not only facilitates thermal aging of the resin itself, but also increases energy consumption for heating and safety problems. Therefore, these methods are very impractical.

Differently from these, a method of recycling polypropylene composite material through the pyrolysis of paint film by adding one or more paint-film removing accelerators such as Lewis acid like tin chloride, alkaline hydroxide, alkaline earth metal hydroxide, amine, metal phosphate or diethnolamine is disclosed in Japanese Patent Publication No. 5-200749. However, this method has the problem of paint-film removing accelerator remaining in plastic resin, which lowers the quality of recycled resin. A method of recycling painted plastic product by crushing and mixing it in a melter containing 10 wt % of organic or inorganic paint-film removing accelerator including 001–3 wt % of bismuth, lead or tin and 0.5–50 wt % of water at 200–320° C. for 0.5–5 min [Japanese Patent Publication No. 6-198652] has problems of low removing effect and bismuth, lead and tin component remaining in recycled resin. A method of obtaining recycled plastic by crushing coated plastic product to uniform size, feeding it to a screw extruder and melt mixing it with water, alkaline aqueous solution or alcohol, and then emitting the decomposition gas of paint film and evaporated water [Japanese Patent Publication No. 6-23748] has the problem of poor physical property of recycled resin due to the remaining alkali component. If less alkali is used in order to solve this problem, the removing effect of paint film lowers.

Various methods of recycling automobile waste plastic bumper were introduced other than said methods. However, an economical method that provides a good mechanical property of recycled plastic resin is not established as yet. That is, a method that provides good removing effect, economical treatment performance and consistent physical property after recycling, using nontoxic and economically-friendly solvent, has not been developed as yet.

SUMMARY OF THE INVENTION

Various investigations have been made to overcome the above-described problems and develop a removing method of paint film that can maintain the physical property of recycled resin and is economical and environment-friendly. As a result, the inventors proved that it is possible to remove paint film effectively while maintaining the original physical property of plastic resin by adding isopropyl alcohol, phenoxy ethanol and alkali in a rector and heating to a certain temperature while stirring, adding plastic resin coated with thermosetting paint film in said reactor, and performing reaction for a short time.

Accordingly, an object of the present invention is to provide an advanced method of removing thermosetting paint film from waste plastic resin.

DETAILED DESCRIPTION OF THE INVENTION

The method of removing paint film by heating and stirring plastic resin coated with thermosetting paint film after adding same in a mixture of alcoholic solvent and alkali is characterized by: inserting isopropyl alcohol, phenoxy alcohol and alkali in a reactor and heating to 50–70° C. while stirring; and performing reaction by adding plastic resin coated with thermosetting paint film while marinating said temperature.

Hereunder is given a more detailed description of the present invention.

The present invention relates to a method of removing thermosetting paint film with superior removing effect and good physical property of remaining resin. Using this invention, it is possible to recycle a large amount of waste plastic resin simply and economically.

A more concrete description of this invention is given below.

Firstly, after adding isopropyl alcohol, phenoxy ethanol and alkali in a temperature-adjustable reactor, the reaction mixture is heated to 50–70° C. while uniformly stirring. If the temperature is below 50° C., the reaction is not fully activated. Otherwise it exceeds 70° C., there arise problems of lowered safety, uneconomical overuse of energy and excessive evaporation of solution. Said isopropyl alcohol and phenoxy alcohol (phenoxy ethanol) are used in the range of 90–70:10–30. If excessive phenoxy ethanol is mixed outside this range, there may be an adversary effect on the physical property of plastic resin.

For said alkali, strong base or inorganic acetate may be used. It is preferable to add 0.5–3 wt % of substance selected from potassium hydroxide, sodium hydroxide, calcium acetate and potassium acetate to 100 wt % of said alcohol solvent. If the addition amount is below 0.5 wt %, the reaction is not fully activated; and it is unnecessary to add more than 3 wt %.

Then, after cutting plastic resin coated with thermosetting paint film to a suitable size, it is added in said reactor and the reaction is carried out at the same temperature.

The reaction time needs to be as short as possible, i.e., in 1–5 min, to minimize the deterioration of physical property due to chemical degradation. If the reaction time is shorter than 1 min, the removal reaction may be incomplete; whereas if it is longer than 5 min, the physical property of resin may deteriorate.

The method of removing paint film according to the present invention is applied mainly to recycling of plastic resin product of automobile parts. It comprises three parts of substrate, primer and paint film. Primer is coated on surface with the thickness of 5–30 $\mu$m in order to increase the coating ability of paint. On top of the primer, thermosetting paint film is coated with about 30 $\mu$m of thickness. The substrate is polypropylene (PP), polyamide (PA) or modified polyphenylene oxide (MPPO). Primer, whose main component being chlorinated polyethylene (CPE), is coated on said substrate excluding MPPO. The thermosetting paint film (including clear coating) is a thermosetting polymer with 3-dimensional network structure. Currently, polyurethane-ester-acryl copolymer is frequently used for the thermosetting paint film. However, one with different composition or structure may be used according to the coating color.

In said reaction, polyurethane and ester in paint film depolymerizes and there occurs cracking in paint film. That is, a crack generates between paint film and CPE primer due to the chemical depolymerization of polyurethane in thermosetting paint film component by alkoxy group generated from the reaction of alcohol (weak acid) with strong base or inorganic acetate as expressed in Formula (1). The depolymerization propagates along this crack.

(1)

Starting from this crack, the paint film is separated physically. It is because CPE primer is physically connected to paint film. That is, alcohol penetrating into the crack enters between paint film and CPE primer, and physically separates paint film which has a weaker binding affinity. Therefore, the paint film can be easily removed without decomposition.

If the surface of paint film is rubbed with sandpaper or scratched with other equipments before the reaction, the removal of paint film can be facilitated. Also, the removal may be easier if the reaction is performed under exposure to supersonic wave by attaching an ultrasonic generator in the reactor.

Lastly, when the reaction is completed, after removing the paint film and solution, the resin is washed with water, desiccated, and then melt extruded to a pellet form. Though this recycled resin includes CPE component, it does not have a large effect on the physical property. The waste solution which was used in the reaction may be reused by filtering the floating paint film and distilling at its boiling temperature. The alcohol component evaporating during the reaction can be collected using a reflux tube.

Therefore, the method of removing thermosetting paint film according to the present invention can be widely applied for products coated with thermosetting polymer such as automobile bumper cover and wheel cover.

Hereunder is given a more detailed description of the present invention using examples. However, it should not be construed as limiting the scope of this invention.

EXAMPLE 1

Removing of MPPO Wheel Cover Paint Film

After mixing 90 g of isopropyl alcohol (hereunder referred to as IPA), 10 g of phenoxy ethanol and 0.5 g of potassium hydroxide in a reactor attached with an ultrasonic generator, the mixture was heated to 60° C. After dipping MPPO wheel cover sample, reaction was performed for 5 min.

For the obtained resin, physical properties such as tensile strength, elasticity, flexural strength, flexural elasticity and izod impact strength were evaluated. The result is shown in Table 1.

EXAMPLE 2

Removing of PA Wheel Cover Paint Film

The same procedure as in Example 1 was carried out for PA wheel cover. The paint film was removed by slight scratching 5 min later. The physical property test result is shown in Table 1.

EXAMPLE 3

Removing of PP Bumper Cover Paint Film

The same procedure as in Example 1 was carried out for PP bumper cover. The paint film was removed by slight scratching 5 min later. The physical property test result is shown in Table 1.

Comparative Example 1

MPPO Virgin Resin

The physical property test result of virgin MPPO is shown in Table 1.

Comparative Example 2

PA Virgin Resin

The physical property test result of virgin PA is shown in Table 1.

TABLE 1

| Items | | Plastic Resin | Tensile Strength (Kgf/cm$^2$) | Elasticity (%) | Flexural Strength (Kgf/cm$^2$) | Flexural Elasticity (Kgf/cm$^2$) | Izod Impact Strength (Kg · cm/cm) |
|---|---|---|---|---|---|---|---|
| Examples | 1 | MPPO | 539 | 23 | 768 | 22281 | 14 |
| | 2 | PA | 413 | 73 | 455 | 11739 | 28 |
| | 3 | PP | 155.6 | 70 | 161 | 7707 | 55 |
| Comparative Examples | 1 | MPPO Virgin | 550 | 30 | 737 | 21225 | 20 |
| | 2 | PA Virgin | 422 | 92 | 562 | 14671 | 35 |

As shown in Table 1, the samples of Examples 1–3 of the present invention maintained over 80% of physical property as compared to those of virgin materials. If a certain portion of virgin resin is added in recycling, a desirable physical property may be obtained.

As explained in detail above, the method of removing thermosetting paint film according to the present invention provides recycled plastic resin with much superior removing efficiency and good physical property by adding plastic resin coated with thermosetting paint film in a reactor containing a mixed solution of isopropyl alcohol, phenoxy ethanol and alkali at a low temperature and performing reaction for 5 min. This method enables an inexpensive, simple and highly value-added recycling process which is safe and environmental-friendly. So, it can be effectively used for recycling of waste plastic products.

What is claimed is:

1. A method of removing thermosetting paint film by adding plastic resin coated with thermosetting paint film into a mixed solution of an alcoholic solvent and alkali and heating this mixed solution while stirring, wherein said method comprises:

a) adding isopropyl alcohol, phenoxy alcohol and alkali in a reactor and heating this mixture to a temperature of 50–70° C. while stirring; and b) adding plastic resin coated with thermosetting paint film and performing a reaction while maintaining said temperature, wherein said isopropyl alcohol and phenoxy alcohol are added in a mixed ratio of 70–90:30–10.

* * * * *